United States Patent
Usami

(10) Patent No.: US 11,548,590 B2
(45) Date of Patent: Jan. 10, 2023

(54) DRIVE UNIT AND ELECTRICALLY ASSISTED VEHICLE

(71) Applicant: YAMAHA HATSUDOKI KABUSHIKI KAISHA, Iwata (JP)

(72) Inventor: Tomohiro Usami, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 17/308,095

(22) Filed: May 5, 2021

(65) Prior Publication Data
US 2021/0387695 A1 Dec. 16, 2021

(30) Foreign Application Priority Data
May 7, 2020 (JP) .............................. JP2020-081834

(51) Int. Cl.
*B62M 6/55* (2010.01)
*B62M 6/45* (2010.01)

(52) U.S. Cl.
CPC ................ *B62M 6/55* (2013.01); *B62M 6/45* (2013.01)

(58) Field of Classification Search
CPC . B62M 6/20; B62M 6/40; B62M 6/45; B62M 6/55; B60L 2200/12; B60L 2200/46; B62K 2204/00
USPC ........................ 180/65.6, 206.4, 206.1, 205.4
See application file for complete search history.

(56) References Cited

U.S. PATENT DOCUMENTS

| | | | | |
|---|---|---|---|---|
| 9,994,284 | B2* | 6/2018 | Urabe | B60K 17/06 |
| 2002/0166708 | A1* | 11/2002 | Tseng | B62M 6/55 180/206.2 |
| 2016/0288872 | A1* | 10/2016 | Shahana | B62M 11/145 |
| 2018/0118304 | A1* | 5/2018 | Greven | B62M 3/003 |
| 2021/0269121 | A1* | 9/2021 | Storti | F16H 63/18 |

FOREIGN PATENT DOCUMENTS

| | | | | |
|---|---|---|---|---|
| CN | 106043582 | * | 10/2016 | B62M 6/55 |
| JP | 2001-163286 A | | 6/2001 | |
| JP | 3081960 U | | 11/2001 | |
| JP | 2014-196080 A | | 10/2014 | |
| JP | 2018-54085 A | | 4/2018 | |

OTHER PUBLICATIONS 2018-54085 to Fukuda Mashiko et al. Apr. 5, 2018. Translation (Year: 2018).*

* cited by examiner

*Primary Examiner* — Anne Marie M Boehler
(74) *Attorney, Agent, or Firm* — Keating & Bennett, LLP

(57) ABSTRACT

A drive unit includes an electric motor including an output shaft including an output gear; a pedal crank shaft extending through a housing, rotatably supported by the housing, and including a driven gear; and a transmission to transmit a torque of the output gear of the electric motor to the driven gear. The transmission includes a decelerator rotatably supported by the housing, and an idle gear rotatably supported by the housing. The decelerator increases the torque of the output shaft of the electric motor, and the increased torque is transmitted to the driven gear via the idle gear.

11 Claims, 8 Drawing Sheets

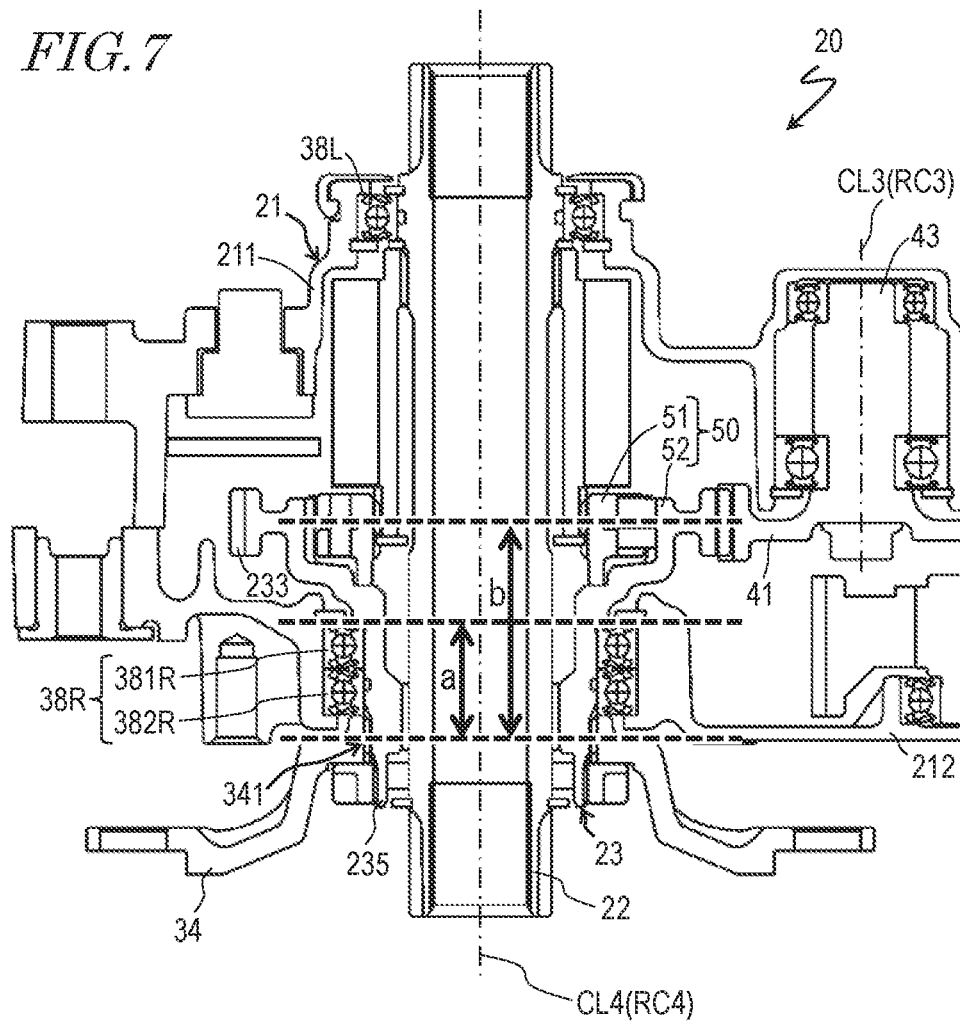
FIG. 7
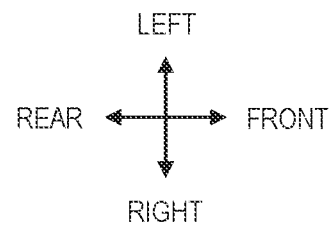

DRIVE UNIT AND ELECTRICALLY ASSISTED VEHICLE

CROSS REFERENCE TO RELATED APPLICATIONS

This application claims the benefit of priority to Japanese Patent Application No. 2020-081834 filed on May 7, 2020. The entire contents of this application are hereby incorporated herein by reference.

BACKGROUND OF THE INVENTION

1. Field of the Invention

The present invention relates to a drive unit attachable to a vehicle frame of an electrically assisted vehicle, and also to an electrically assisted vehicle including such a drive unit.

2. Description of the Related Art

An example of vehicle movable in accordance with power generated by a power source is an electrically assisted bicycle by which power provided by a rider pedaling the bicycle is assisted by an electric motor (see, for example, Japanese Laid-Open Patent Publication No. 2014-196080). An electrically assisted bicycle causes the electric motor to generate drive power in accordance with human power applied by the rider to pedals. Thus, the electrically assisted bicycle may alleviate the load imposed on the rider while, for example, running on a slope or running with a cargo.

The electrically assisted bicycle includes a drive unit including an electric motor and the like. Known drive units include a drive unit of a type located in a hub of a rear wheel and a drive unit of a type attached to a bottom end of a vehicle frame (in the vicinity of a bottom bracket). Recently, the latter type of drive unit is becoming mainstream.

The electrically assisted bicycle disclosed in Japanese Laid-Open Patent Publication No. 2014-196080 includes a drive unit attached to a bottom end of a vehicle frame. The drive unit includes a housing, an electric motor, a pedal crank shaft and the like. The electric motor is accommodated in the housing, and generates drive power that assists the pedal effort of the rider.

The pedal crank shaft is located to pass through the housing in a left-right direction of the vehicle. Pedals are attached to the pedal crank shaft via arms. The rotation of the pedal crank shaft is transmitted to the rear wheel via a drive sprocket, a chain, a driven sprocket and the like.

In a drive unit of an electrically assisted bicycle, many components other than a battery, namely, an electric motor, a decelerator, a pedal crank shaft, a controller and the like are accommodated in one case in a concentrated manner. Some electrically assisted bicycles adopt a mounting system called a "center mounting system", by which such a drive unit is attached to a position corresponding to the position of a pedal crank shaft of a general bicycle.

This mounting system allows heavy mechanical and electronic parts to be located in a center bottom portion of the vehicle in a concentrated manner, and thus has an advantage of improving the weight balance of the vehicle. This mounting system allows many components to be accommodated in one case in a concentrated manner, and thus also has an advantage of allowing the drive unit to be mounted on many types of bicycle frames with a minimum change at low cost.

Meanwhile, in the case where the drive unit is located at a position in an electrically assisted bicycle corresponding to the position of the pedal crank shaft in a general bicycle, there occurs a problem that the rear center length (length between the pedal crank shaft and the axle of the rear wheel) is made longer than that of the general bicycle. In general, in the case where the rear center length is made longer, the agility in handling is decreased.

For a type of vehicle running on a non-asphalt-paved road, such as a mountain bike or the like, it is important that an appropriate minimum ground clearance (distance from the ground to the drive unit) is provided. In the case where the minimum ground clearance is short, the location where the vehicle can run is limited, which decreases the running performance.

In the case where the drive unit has a large size, the parts around the drive unit, for example, a rear suspension, a battery and the like are restricted in the positional arrangement thereof.

SUMMARY OF THE INVENTION

Preferred embodiments of the present invention provide drive units each having a decreased size, and electrically assisted vehicles including such drive units.

A drive unit according to a preferred embodiment of the present invention is usable in an electrically assisted vehicle. The drive unit includes an electric motor including an output shaft including an output gear; a housing accommodating a portion of, or an entirety of, the electric motor; a pedal crank shaft extending through the housing, rotatably supported by the housing, and including a driven gear; a transmission to transmit a torque of the output gear of the electric motor to the driven gear; and a resultant force output shaft rotatable coaxially with the pedal crank shaft to combine a pedal effort and an assist power of the electric motor. The transmission includes a decelerator rotatably supported by the housing in the housing, and an idle gear rotatably supported by the housing in the housing. The decelerator increases the torque of the output shaft of the electric motor, and the increased torque is transmitted to the driven gear via the idle gear.

In order to shorten the rear center length of the electrically assisted vehicle, it is conceivable to shorten the diameter of the driven gear provided on the pedal crank shaft. If a "two-axial decelerator" is located between the driven gear on the pedal crank shaft and the electric motor, it is difficult to shorten the width of the drive unit in the axial direction. The decelerator includes the rotation shaft on which two gears having different diameters from each other and including different numbers of teeth from each other are located thereon in the axial direction. The two-axial decelerator includes two such rotation shafts, and the two rotation shafts are shifted from each other in the axial direction. Therefore, the size of the two-axial decelerator in the axial direction is increased.

According to a preferred embodiment of the present invention, the idle gear is used so that the diameter of the driven gear may be decreased, and thus the rear center length of the electrically assisted vehicle may be shortened with no increase in the width (size in the axial direction) of the drive unit. The use of the idle gear may also improve the degree of freedom of positional arrangement of the electric motor, the decelerator and the driven gear, and thus may further decrease the size of the drive unit.

In a preferred embodiment of the present invention, the electric motor may be supported by the housing such that the output shaft rotates about a first central axis. The decelerator may be supported by the housing in the housing so as to be rotatable about a second central axis, and may include a first transmission gear, a second transmission gear including teeth of a smaller number than that of the first transmission gear, and a transmission shaft to transmit a rotation of the first transmission gear to the second transmission gear. The idle gear may be supported by the housing in the housing so as to be rotatable about a third central axis. The pedal crank shaft may extend through the housing along a fourth central axis, and may be supported by the housing so as to be rotatable about the fourth central axis.

The torque increased by the two transmission gears having different numbers of teeth from each other may be transmitted to the driven gear via the idle gear.

In a preferred embodiment of the present invention, the idle gear may be engaged with each of the second transmission gear of the decelerator and the driven gear.

The idle gear is engaged with each of the second transmission gear and the driven gear so that the torque may be transmitted from the decelerator to the driven gear via the single idle gear. The presence of such an idle gear may easily decrease the size of the driven gear.

In a preferred embodiment of the present invention, the first transmission gear of the decelerator may be engaged with the output gear of the electric motor.

Since the single decelerator and the single idle gear transmit the torque of the electric motor to the driven gear, the size of the drive unit may be decreased with no use of any extra gear.

In a preferred embodiment of the present invention, a distance from a plane including the first central axis and the fourth central axis to the third central axis may be longer than a distance from the plane to the second central axis, and the idle gear may have a diameter less than any of a diameter of the driven gear and a diameter of the first transmission gear.

The idle gear does not decelerate or accelerate, and thus merely needs to have such a size as to achieve power transmission between the decelerator and the driven gear. Therefore, the idle gear may have a diameter less than each of the diameter of the first transmission gear of the decelerator and the diameter of the driven gear on the pedal crank shaft. The distance from the plane including the first central axis and the fourth central axis to the third central axis is longer than the distance from the plane to the second central axis so that the idle gear having a relatively small diameter may be located outward of the first transmission gear. In other words, the first transmission gear having a relatively long diameter may be located at a more inward position in the housing, and thus may be prevented from protruding outward. The housing may have an outer contour along the idle gear having a relatively small diameter, not along the first transmission gear having a relatively long diameter. Therefore, the size of the drive unit may be decreased.

In a preferred embodiment of the present invention, a distance from the plane including the first central axis and the fourth central axis to a farthest point of the idle gear may be longer than each of a distance from the plane to a farthest point of the output gear, a distance from the plane to a farthest point of the first transmission gear, and a distance from the plane to a farthest point of the driven gear, and the idle gear may have a diameter less than any of a diameter of the driven gear and a diameter of the first transmission gear.

The idle gear does not decelerate or accelerate, and thus merely needs to have such a size as to achieve power transmission between the decelerator and the driven gear. Therefore, the idle gear may have a diameter less than each of the diameter of the first transmission gear of the decelerator and the diameter of the driven gear on the pedal crank shaft. The distance from the plane including the first central axis and the fourth central axis to the farthest point of the idle gear is longer than each of the distance from the plane to the farthest point of the output gear, the distance from the plane to the farthest point of the first transmission gear, and the distance from the plane to the farthest point of the driven gear. With this structure, the idle gear having a relatively small diameter may be located outward of the first transmission gear. In other words, the first transmission gear having a relatively long diameter may be located at a more inward position in the housing, and thus may be prevented from protruding outward. The housing may have an outer contour along the idle gear having a relatively small diameter, not along the first transmission gear having a relatively long diameter. Therefore, the size of the drive unit may be decreased.

In a preferred embodiment of the present invention, as seen in an axial direction parallel to the first central axis, a triangle having three axes among the first through fourth central axes as apexes may have the remaining one axis among the first through fourth central axes located therein.

The gear rotating about the remaining one axis may be located at a more inward position in the housing, and thus the gear may be prevented from protruding outward. With this structure, the size of the drive unit may be decreased.

In a preferred embodiment of the present invention, as seen in an axial direction parallel to the first central axis, the second central axis may be located in a triangle having the first central axis, the third central axis, and the fourth central axis as apexes.

The idle gear does not decelerate or accelerate, and thus merely needs to have such a size as to achieve power transmission between the decelerator and the driven gear. Therefore, the idle gear may have a diameter less than each of the diameter of the first transmission gear of the decelerator and the diameter of the driven gear on the pedal crank shaft. The second central axis is located in a triangle having the first central axis, the third central axis, and the fourth central axis as the apexes. With this structure, the first transmission gear having a relatively long diameter may be located at a more inward position in the housing, and thus may be prevented from protruding outward. The housing may have an outer contour along the idle gear having a relatively small diameter, not along the first transmission gear having a relatively long diameter. Therefore, the size of the drive unit may be decreased.

In a preferred embodiment of the present invention, as seen in an axial direction parallel to the first central axis, at least a portion of the driven gear may overlap the first transmission gear.

The driven gear and the first transmission gear are located such that at least a portion of the driven gear and the first transmission gear overlap each other, and consequently, the second central axis and the fourth central axis may be closer to each other. With this structure, the first central axis and the fourth central axis may be closer to each other. The distance between the first central axis and the fourth central axis may be shortened, and thus the size of the drive unit in the front-rear direction may be decreased. The size of the drive unit in the front-rear direction is decreased so that the space for the battery unit to be located in the down tube is provided.

In a vehicle in which the battery unit is located in the down tube, the battery unit is located in a space between the pedal crank shaft and the front wheel in the front-rear direction of the vehicle (located in a front center portion). An attempt to increase the capacitance of the battery results in an increase in the size of the battery unit, and the front center length needs to be longer accordingly. However, in the case where the front center length is longer, there occurs a problem that the operability of the vehicle is decreased.

According to a preferred embodiment of the present invention, the size of the drive unit in the front-rear direction is decreased so that the degree of freedom of positional arrangement of the battery unit may be increased. The battery unit having a large capacitance may easily be located without increasing the front center length.

In a preferred embodiment of the present invention, as seen in an axial direction parallel to the first central axis, at least a portion of a region where the driven gear and the idle gear are engaged with each other may overlap the first transmission gear.

The first transmission gear, the idle gear, and the driven gear are located such that at least a portion of the region where the driven gear and the idle gear are engaged with each other overlaps the first transmission gear. Consequently, the second central axis and the fourth central axis may be closer to each other. With this structure, the first central axis and the fourth central axis may be closer to each other. The distance between the first central axis and the fourth central axis may be shortened, and thus the size of the drive unit in the front-rear direction may be decreased.

In a preferred embodiment of the present invention, as seen in an axial direction parallel to the first central axis, the third central axis may overlap the first transmission gear.

The idle gear and the decelerator are located such that the third central axis and the first transmission gear overlap each other, and consequently, the second central axis and the third central axis may be closer to each other. With this structure, the first central axis and the fourth central axis may be closer to each other. The distance between the first central axis and the fourth central axis may be shortened, and thus the size of the drive unit in the front-rear direction may be decreased.

In a preferred embodiment of the present invention, the pedal crank shaft may be provided with a one-way clutch.

The pedal crank shaft is provided with the one-way clutch so that a structure is provided in which a forward rotation of the pedal crank shaft is transmitted to the drive sprocket but a reverse rotation of the pedal crank shaft is not transmitted to the drive sprocket.

An electrically assisted vehicle according to a preferred embodiment of the present invention includes the above-described drive unit.

The electrically assisted vehicle includes the drive unit in which the driven gear on the pedal crank shaft has a small diameter so that the rear center length of the electrically assisted vehicle may be shortened.

The drive unit according to a preferred embodiment of the present invention uses the idle gear so that the diameter of the driven gear may be decreased, and thus the rear center length of the electrically assisted vehicle may be shortened with no increase in the width (size in the axial direction) of the drive unit. The use of the idle gear may improve the degree of freedom of positional arrangement of the electric motor, the decelerator, and the driven gear, and thus may further decrease the size of the drive unit.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a cross-sectional view showing a structure of a driven gear 233 and the vicinity thereof in the drive unit 20 according to a preferred embodiment of the present invention.

DETAILED DESCRIPTION OF THE PREFERRED EMBODIMENTS

Hereinafter, drive units and electrically assisted vehicles including the drive units according to preferred embodiments of the present invention will be described with reference to the drawings. In the description of the preferred embodiments, like components will bear like reference signs, and overlapping descriptions will be omitted. In the preferred embodiments of the present invention, "front", "rear", "left", "right", "up" and "down" respectively refer to "front", "rear", "left", "right", "up" and "down" based on a state where a rider is sitting on a saddle (seat) of the electrically assisted vehicle while facing a handle. The following preferred embodiments are merely illustrative, and the present invention is not limited to the following preferred embodiments in any way.

Electrically Assisted Bicycle

Figure 1:
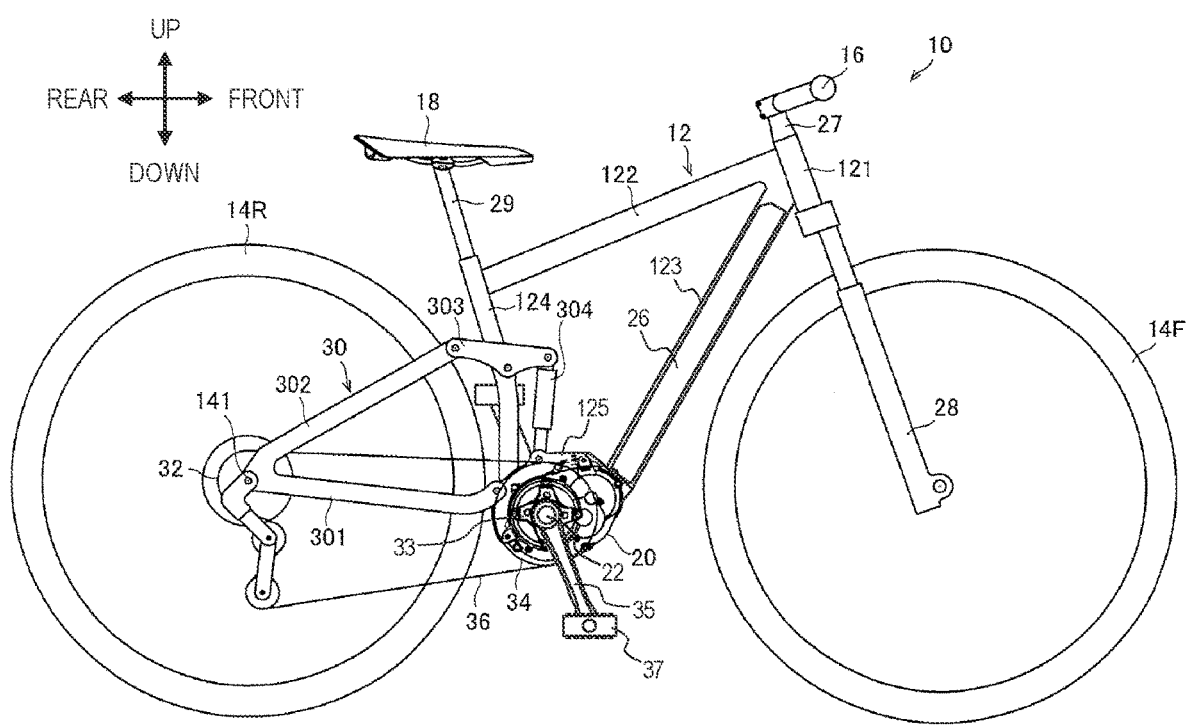
FIG. 1 is a right side view of an electrically assisted bicycle 10 according to a preferred embodiment of the present invention.

With reference to FIG. 1, an electrically assisted bicycle 10 as an example of electrically assisted vehicle according to a preferred embodiment of the present invention will be described. FIG. 1 is a right side view generally showing a structure of the electrically assisted vehicle 10.

The electrically assisted bicycle 10 includes a vehicle frame 12, a front wheel 14F, a rear wheel 14R, a handle 16 and a saddle 18. The electrically assisted bicycle 10 further includes a drive unit 20 and a battery unit 26.

The vehicle frame 12 includes a head tube 121, a top tube 122, a down tube 123, a seat tube 124, and a bracket 125.

The head tube 121 is located in a front portion of the vehicle frame 12, and extends in an up-down direction. A stem 27 is rotatably inserted into the head tube 121. A handle 16 is secured to a top end of the stem 27. A front fork 28 is secured to a bottom end of the stem 27. The front wheel 14F is rotatably attached to a bottom end of the front fork 28. More specifically, the front wheel 14F is supported by the vehicle frame 12 via the stem 27 and the front fork 28.

The top tube 122 is located to the rear of the head tube 121, and extends in a front-rear direction. A front end of the top tube 122 is connected with the head tube 121. A rear end of the top tube 122 is connected with the seat tube 124.

The down tube 123 is located to the rear of the head tube 121, and extends in the front-rear direction. The down tube 123 is located below the top tube 122. A front end of the down tube 123 is connected with the head tube 121. In the example shown in FIG. 1, a front portion of the down tube 123 is also connected with a front end portion of the top tube 122. A rear end of the down tube 123 is connected with the bracket 125.

The battery unit 26 is attached to the down tube 123. In the example shown in FIG. 1, the battery unit 26 is attached to the inside of the down tube 123. The battery unit 26 supplies electric power to the drive unit 20. The battery unit 26 includes a battery and a control circuit. The battery is a rechargeable battery rechargeable and dischargeable. The control circuit controls the charge and discharge of the battery, and also monitors the output current, the remaining battery level and the like of the battery.

The seat tube 124 is located to the rear of the top tube 122 and the down tube 123, and extends in the up-down direction. A bottom end of the seat tube 124 is connected with the bracket 125. More specifically, the seat tube 124 extends upward from the bracket 125.

In the example shown in FIG. 1, the seat tube 124 is bent at a middle position in the up-down direction. As a result, a bottom portion of the seat tube 124 extends in the up-down direction, whereas a top portion of the seat tube 124 extends in a direction inclined with respect to the up-down direction.

A seat post 29 is inserted into the seat tube 124. The saddle 18 is attached to a top end of the seat post 29.

The bracket 125 is located at a bottom end of the vehicle frame 12. The bracket 125 supports the drive unit 20. The drive unit 20 attached to the vehicle frame 12 generates drive power to be transmitted to a wheel (in this example, the rear wheel 14R). The details of the drive unit 20 will be described below.

The vehicle frame 12 further includes a swing arm 30, a pair of connection arms 303 and a suspension 304. The swing arm 30 includes a pair of chainstays 301 and a pair of seatstays 302.

The pair of chainstays 301 each extend in the front-rear direction. The pair of chainstays 301 are located side by side in the left-right direction. The rear wheel 14R is located between the pair of chainstays 301. The pair of chainstays 301 are located bilaterally symmetrically. Therefore, FIG. 1 shows only the right chainstay 301.

A front end portion of each of the chainstays 301 is attached to the bracket 125. More specifically, each chainstay 301 extends rearward from the bracket 125. Each chainstay 301 is swingable, about an axis line extending in the left-right direction, with respect to the bracket 125.

An axle 141 of the rear wheel 14R is non-rotatably attached to a rear end portion of each chainstay 301. More specifically, the rear wheel 14R is supported by the pair of chainstays 301 so as to be rotatable about the axle 141. In other words, the rear wheel 14R is supported by the vehicle frame 12. A multi-stage driven sprocket 32 is secured to the rear wheel 14R.

The pair of seatstays 302 each extend in the front-rear direction. The pair of seatstays 302 are located side by side in the left-right direction. The rear wheel 14R is located between the pair of seatstays 302. The pair of seatstays 302 are located bilaterally symmetrically. Therefore, FIG. 1 shows only the right seatstay 302.

A rear end portion of the left seatstay 302 is connected with the rear end portion of the left chainstay 301. A rear end portion of the right seatstay 302 is connected with the rear end portion of the right chainstay 301.

The pair of connection arms 303 each extend in the front-rear direction. The pair of connection arms 303 are located side by side in the left-right direction. The seat tube 124 is located between the pair of connection arms 303. The pair of connection arms 303 are located bilaterally symmetrically. Therefore, FIG. 1 shows only the right connection arm 303.

Each of the connection arms 303 is attached to the seat tube 124. Each connection arm 303 is swingable, about an axis line extending in the left-right direction, with respect to the seat tube 124.

As seen in a side view of the vehicle, a front end of each connection arm 303 is located to the front of the seat tube 124. As seen in a side view of the vehicle, a rear end of each connection arm 303 is located to the rear of the seat tube 124.

A rear end portion of the right connection arm 303 is attached to a front end portion of the right seatstay 302. The right connection arm 303 is swingable, about an axis line extending in the left-right direction, with respect to the right seatstay 302.

A rear end portion of the left connection arm 303 is attached to a front end portion of the left seatstay 302. The left connection arm 303 is swingable, about an axis line extending in the left-right direction, with respect to the left seatstay 302.

The suspension 304 is located to the front of the seat tube 124 and to the rear of the down tube 123. A top end portion of the suspension 304 is attached to the pair of connection arms 303. The suspension 304 is swingable, about an axis line extending in the left-right direction, with respect to the pair of connection arms 303. A bottom end portion of the suspension 304 is attached to the bracket 125. The suspension 304 is swingable, about an axis line extending in the left-right direction, with respect to the bracket 125. The position at which the suspension 304 is attached to the bracket 125 is to the front of the position at which the seat tube 124 is attached to the bracket 125.

A drive sprocket 34 is attached to the drive unit 20 via a support member 33. A chain is wound along the drive sprocket 34 and the driven sprocket 32.

Drive Unit

Figure 2:
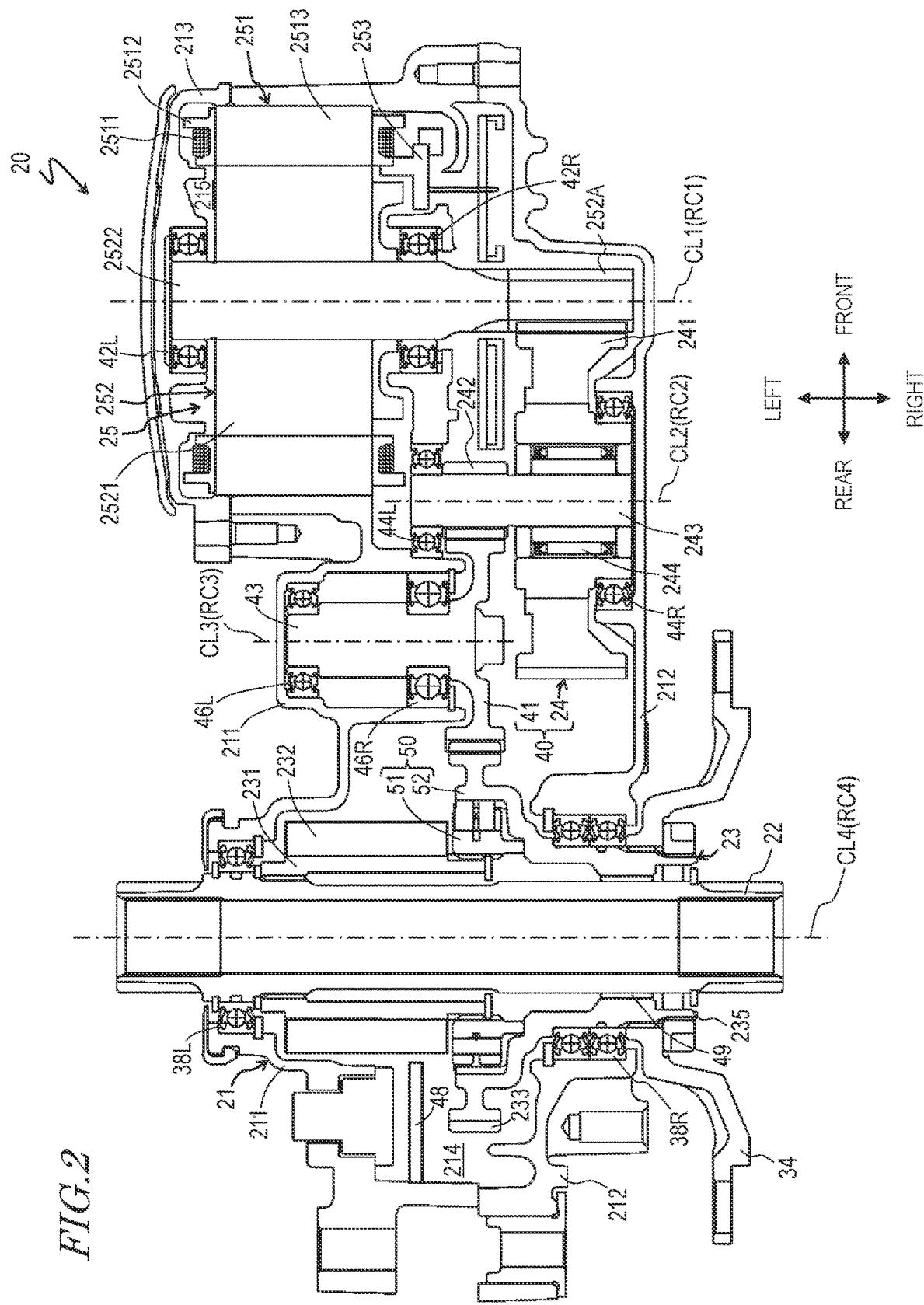
FIG. 2 is a cross-sectional view showing an internal structure of a drive unit 20 included in the electrically assisted bicycle 10 according to a preferred embodiment of the present invention.

With reference to FIG. 2, an example of the structure of the drive unit 20 will be described. FIG. 2 is a cross-sectional view showing an example of the internal structure of the drive unit 20.

As shown in FIG. 2, the drive unit 20 includes a housing 21, a pedal crank shaft 22, a rotation shaft 23, a transmission mechanism 40 and an electric motor 25.

First, a structure of the housing 21 according to this preferred embodiment will be described.

The housing 21 is secured to the bracket 125 (FIG. 1) via a plurality of tightening tools. The housing 21 includes a first case 211, a second case 212, and a cover 213. The first case 211, the second case 212 and the cover 213 are each made of a metal material (e.g., an aluminum alloy).

The first case 211 fits to the second case 212 from the left in the left-right direction. The first case 211 and the second case 212 are secured to each other via a plurality of tightening tools. As a result, a space 214 is formed between the first case 211 and the second case 212.

The cover 213 fits to the first case 211 from the left in the left-right direction. The cover 213 and the first case 211 are secured to each other via a plurality of tightening tools. As a result, a space 215 enclosed by the cover 213 is formed to the left of the first case 211. The motor 25 is accommodated in the space 215.

Now, a structure of the pedal crank shaft 22 according to this preferred embodiment will be described.

The pedal crank shaft 22 is located to extend through the housing 21 in the left-right direction of the vehicle, and is rotatably supported by the housing 21. A central axis line CL4 of the pedal crank shaft 22 extends in the left-right direction. As seen in an axial direction of the pedal crank shaft 22 (in a thrust direction), the central axis line CL4 is a rotation center axis RC4 (fourth central axis) of the pedal crank shaft 22. The pedal crank shaft 22 is rotatable, about the central axis line CL4, with respect to the housing 21.

The pedal crank shaft 22 extends through the housing 21 along the fourth central axis RC4, and is supported by the housing 21 so as to be rotatable about the fourth central axis RC4. In the housing 21, the pedal crank shaft 22 is rotatably supported by a pair of bearings 38L and 38R. The bearing 38L is located on the left side in the axial direction, and is secured to the first case 211. The bearing 38R is located on the right side in the axial direction, and is secured to the second case 212.

The pedal crank shaft 22 extends through the rotation shaft 23. The rotation shaft 23 is accommodated in the housing 21. The details of the rotation shaft 23 will be described below. A pair of, namely, left and right, crank arms 35 (see FIG. 1) are attached to the pedal crank shaft 22. A pedal 37 (see FIG. 1) is attached to each of the crank arms 35.

Now, a structure of the electric motor 25 and the transmission mechanism 40 according to this preferred embodiment will be described.

The electric motor 25 is accommodated in the housing 21, and is secured to the housing 21. The electric motor 25 generates drive power that assists the running of the electrically assisted bicycle 10. The electric motor 25 includes a stator 251 and a rotor 252.

The stator 251 includes a plurality of bobbins 2512, around each of which a coil 2511 is wound. An iron core 2513 is inserted into each of the bobbins 2512. The stator 251 is located in the space 215. In this state, the stator 251 is secured to the first case 211.

A support member 253 is attached to the stator 251. The support member 253 is made of a resin material. A plurality of busbars (not shown) are embedded in the support member 253. The busbars are each connected with the coil 2511 correspondingly thereto. Transmission of electric power to the busbars is controlled so that a magnetic force is generated in the stator 251.

The rotor 252 is located inward of the stator 251. A central axis line CL1 of the rotor 252 is parallel or substantially parallel to the central axis line CL4 of the pedal crank shaft 22. More specifically, the rotor 252 is parallel or substantially parallel to the central axis line CL4 of the pedal crank shaft 22. As seen in the axial direction of the pedal crank shaft 22, the central axis line CL1 is a rotation center axis RC1 (first central axis) of the rotor 252.

The rotor 252 includes a rotor main body 2521 and an output shaft 2522. An outer circumferential surface of the rotor main body 2521 is magnetized with N poles and S poles alternately in a circumferential direction.

The output shaft 2522 extends through the rotor main body 2521. The output shaft 2522 is secured to the rotor main body 2521. More specifically, the output shaft 2522 is rotatable together with the rotor main body 2521.

In the housing 21, the output shaft 2522 is supported by the housing 21 so as to be rotatable about the first central axis RC1. The output shaft 2522 is supported by two bearings 42L and 42R so as to be rotatable, about the central axis line CL1, with respect to the housing 21. The bearing 42L is secured to the cover 213. The bearing 42R is located to the right of the rotor main body 2521, and is secured to the first case 211. The output shaft 2522 extends through the first case 211. A portion of the output shaft 2522 that is located in the space 214 includes an output gear 252A thereon. The output gear 252A is, for example, a helical gear.

The transmission mechanism 40 is accommodated in the housing 21. Specifically, the transmission mechanism 40 is located in the space 214. The transmission mechanism 40 includes a decelerator 24, an idle gear 41, and a rotation shaft 43. The transmission mechanism 40 transmits a torque of the output gear 252A of the electric motor 25 to a driven gear 233 described below.

The decelerator 24 is rotatably supported by the housing 21, and increases the torque of the output gear 252A of the electric motor 25. The decelerator 24 includes a first transmission gear 241, a second transmission gear 242, and a transmission shaft 243. A central axis line CL2 of the transmission shaft 243 is parallel or substantially parallel to the central axis line CL4 of the pedal crank shaft 22. More specifically, the transmission shaft 243 extends parallel or substantially parallel to the central axis line CL4 of the pedal crank shaft 22. As seen in an axial direction of the transmission shaft 243, namely, in the axial direction of the pedal crank shaft 22, the central axis line CL2 is a rotation center axis RC2 (second central axis) of the transmission shaft 243. In the housing 21, the decelerator 24 is supported by the housing 21 so as to be rotatable about the second central axis RC2.

The first transmission gear 241 is located on a right portion of the transmission shaft 243 in the axial direction. A left portion of the transmission shaft 243 is rotatably supported by a bearing 44L. The first transmission gear 241 located on the right portion of the transmission shaft 243 is rotatably supported by a bearing 44R. The transmission shaft 243 and the first transmission gear 241 are supported by the two bearings 44L and 44R so as to be rotatable about the central axis line CL2. The bearing 44L is secured to the first case 211. The bearing 44R is secured to the second case 212.

The first transmission gear 241 is meshed with the output gear 252A of the electric motor 25. With this structure, the drive power generated by the electric motor 25 is transmitted to the first transmission gear 241 from the output gear 252A.

A one-way clutch 244 is located between the first transmission gear 241 and the transmission shaft 243. The one-way clutch 244 couples the transmission shaft 243 and the first transmission gear 241 to each other. The one-way clutch 244 regulates the rotation of the first transmission gear 241 with respect to the transmission shaft 243 to one direction. A rotation force of the output gear 252A acting in such a direction as to rotate the rear wheel 14R (FIG. 1) of the electrically assisted bicycle 10 forward is transmitted to the transmission shaft 243 via the first transmission gear 241, whereas a rotation force of the output gear 252A acting in such a direction as to rotate the rear wheel 14R rearward is not transmitted to the transmission shaft 243. The one-way clutch 244 also prevents a forward rotation force of the pedal crank shaft 22 generated by human power of the rider from being transmitted to the electric motor 25.

The first transmission gear 241 has a diameter longer than that of the output gear 252A of the electric motor 25, and includes teeth of a larger number than that of the output gear 252A. More specifically, the first transmission gear 241 is decelerated more than the output gear 252A.

The second transmission gear 242 is made of a metal material (e.g., iron). The second transmission gear 242 is located on the transmission shaft 243. The second transmission gear 242 is located at a position different from that of the first transmission gear 241 in the axial direction of the transmission shaft 243. The second transmission gear 242 has a diameter less than that of the first transmission gear 241, and includes teeth of a smaller number than that of the first transmission gear 241. The transmission shaft 243 and the second transmission gear 242 are integral in this preferred embodiment, but are not limited to this. The second transmission gear 242 may be secured to the transmission shaft 243 by serration coupling (or by press-fit). The second transmission gear 242 is rotatable together with the transmission shaft 243. The transmission shaft 243 transmits the rotation of the first transmission gear 241 to the second transmission gear 242.

The idle gear 41 is made of a metal material (e.g., iron). The idle gear 41 is located on the rotation shaft 43. The idle gear 41 is secured to the rotation shaft 43 by, for example, a tightening tool, but is not limited to this. The idle gear 41 may be secured to the rotation shaft 43 by serration coupling (or by press-fit). The idle gear 41 and the rotation shaft 43 may be integral. The idle gear 41 is rotatable together with the rotation shaft 43.

A central axis line CL3 of the rotation shaft 43 is parallel or substantially parallel to the central axis line CL4 of the pedal crank shaft 22. More specifically, the rotation shaft 43 extends parallel or substantially parallel to the central axis line CL4 of the pedal crank shaft 22. As seen in an axial direction of the rotation shaft 43, namely, in the axial direction of the pedal crank shaft 22, the central axis line CL3 is a rotation center axis RC3 (third central axis) of the rotation shaft 43. In the housing 21, the idle gear 41 secured by the rotation shaft 43 is supported by the housing 21 so as to be rotatable about the third central axis RC3.

The rotation shaft 43 is supported by two bearings 46L and 46R so as to be rotatable about the central axis line CL3. The bearings 46L and 46R are secured to the first case 211. The idle gear 41 is located closer to the bearing 46R than to the bearing 46L in the axial direction of the rotation shaft 43. The idle gear 41 is meshed with the second transmission gear 242 of the decelerator 24. With this structure, the output torque of the electric motor 25 increased by the decelerator 24 is transmitted to the idle gear 41.

Now, a structure of the vicinity of the pedal crank shaft 22 will be described.

The rotation shaft 23 is coaxial with the pedal crank shaft 22, and is rotatable together with the pedal crank shaft 22. The rotation shaft 23 includes a coupling shaft 231 and a one-way clutch 50.

The coupling shaft 231 has a cylindrical shape. The pedal crank shaft 22 is inserted into the coupling shaft 231. The coupling shaft 231 is coaxial with the pedal crank shaft 22.

A left end portion of the coupling shaft 231 is coupled with the pedal crank shaft 22 by serration coupling or the like. As a result, regardless of whether the pedal crank shaft 22 is rotated forward or rearward, the coupling shaft 231 is rotated together with the pedal crank shaft 22.

A torque detection device 232 is located around the coupling shaft 231. The torque detection device 232 is supported by the coupling shaft 231, and is not rotatable with respect to the first case 211. The torque detection device 232 detects a torque generated in the coupling shaft 231 when the driver steps on the pedals. The torque detection device 232 is, for example, a magnetostrictive torque sensor. The torque detection device 232 outputs a signal in accordance with the detected torque to a controller mounted on a substrate 48. The controller refers to the torque detected by the torque detection device 232 to learn the state of the pedaling performed by the driver and control the electric motor 25.

The one-way clutch 50 is located to the right of the torque detection device 232 in the axial direction of the pedal crank shaft 22. The one-way clutch 50 is located on the pedal crank shaft 22 via the coupling shaft 231. The one-way clutch 50 is coaxial with the pedal crank shaft 22. The one-way clutch 50 includes an inner member 51 and an outer member 52.

The inner member 51 of the one-way clutch 50 has a cylindrical shape. A right portion of the coupling shaft 231 is inserted into the inner member 51. The inner member 51 is coaxial with the coupling shaft 231. In this state, the right portion of the coupling shaft 231 is coupled with the inner member 51 by serration coupling or the like. As a result, regardless of whether the coupling shaft 231 is rotated forward or rearward, the inner member 51 is rotated together with the coupling shaft 231. More specifically, regardless of whether the pedal crank shaft 22 is rotated forward or rearward, the inner member 51 is rotated together with the pedal crank shaft 22. The coupling shaft 231 and the inner member 51 act as a crank rotation input shaft that is rotatable integrally with the pedal crank shaft 22.

The outer member 52 of the one-way clutch 50 has a cylindrical shape. The pedal crank shaft 22 is inserted into the outer member 52. A slide bearing 49 is located between the outer member 52 and the pedal crank shaft 22. With this structure, the outer member 52 is rotatable coaxially with the pedal crank shaft 22.

A latchet mechanism as a one-way clutch mechanism is located between the outer member 52 and the inner member 51. With this structure, a forward rotation force of the inner member 51 is transmitted to the outer member 52, whereas a rearward rotation force of the inner member 51 is not transmitted to the outer member 52. A forward rotation force of the outer member 52 generated by the rotation of the electric motor 25 is not transmitted to the inner member 51.

The outer member 52 is supported by the bearing 38R so as to be rotatable, about the central axis line CL4 of the pedal crank shaft 22, with respect to the housing 21. The outer member 52 extends through the second case 212. The drive sprocket 34 is attached to a portion of the outer member 25 that is outward of (to the right of) the housing 21.

The outer member 52 includes the driven gear 233. The driven gear 233 is located on the pedal crank shaft 22 via the one-way clutch 50 and the coupling shaft 231. The driven gear 233 is meshed with the idle gear 41. The driven gear 233 has a diameter longer than that of each of the second transmission gear 242 and the idle gear 41, and includes teeth of a larger number than that of each of the second transmission gear 242 and the idle gear 41. More specifically, the driven gear 233 is rotated at a rotation rate lower than the rotation rate of each of the second transmission gear 242 and the idle gear 41. The idle gear 41 is meshed with each of the second transmission gear 242 and the driven gear 233 so that the output torque of the electric motor 25 increased by the decelerator 24 may be transmitted to the driven gear 233 via the single idle gear 41.

The outer member 52 transmits resultant force of the human power (pedal effort) transmitted to the coupling shaft 231 and assist drive power of the electric motor 25 to the drive sprocket 34. The outer member 52 defines a resultant force output shaft 235, which combines the human power that is input via the one-way clutch 50 and the assist drive power that is input via the driven gear 233 and outputs the resultant force. The resultant force output shaft 235 rotates coaxially with the pedal crank shaft 22. The resultant force output shaft 235 is included in the rotation shaft 23.

Idle Gear

Now, the drive unit 20 including the idle gear 41 according to this preferred embodiment will be described in more detail.

As described above, in the case where the drive unit is located at a position in the electrically assisted bicycle corresponding to the position of the pedal crank shaft of a general bicycle, there occurs a problem that the rear center length is longer than in the general bicycle.

In order to shorten the rear center length of the electrically assisted vehicle, it is conceivable to shorten the diameter of the driven gear provided on the pedal crank shaft. If a "two-axial decelerator" is located between the driven gear and the electric motor, it is difficult to shorten the width of the drive unit in the axial direction. Two gears having different diameters from each other and including different numbers of teeth from each other are located in the axial direction on the rotation shaft of the decelerator. Therefore, the size of the rotation shaft in the axial direction tends to be increased. The two-axial decelerator includes two such rotation shafts, and the two rotation shafts are shifted from each other in the axial direction. Therefore, the size of the two-axial decelerator in the axial direction is increased.

In this preferred embodiment, the idle gear 41 is provided on a power transmission path between the decelerator 24 and the driven gear 233 so that the diameter of the driven gear 233 may be decreased. Even in the case where the diameter of the driven gear 233 is decreased, the output torque of the electric motor 25 may be transmitted to the driven gear 233 via the idle gear 41. In this preferred embodiment, such use of the idle gear 41 allows the diameter of the driven gear 233 to be decreased, thus to shorten the rear center length of the electrically assisted bicycle 10, with no increase in the width (size in the axial direction) of the drive unit 20. The use of the idle gear 41 may also improve the degree of freedom of the positional arrangement of the electric motor 25, the decelerator 24 and the driven gear 233, and thus may further decrease the size of the drive unit 20.

Hereinafter, the positional arrangement of the components of the drive unit 20 that makes it possible to decrease the size of the drive unit 20 will be described.

FIG. 3 through FIG. 6 each show a positional arrangement of the components of the drive unit 20 as seen in the axial direction. The axial direction is parallel or substantially parallel to the first through fourth central axes RC1 through RC4.

As described above, the output shaft 2522 and the output gear 252A of the electric motor 25 rotate about the first central axis RC1. The first transmission gear 241, the second transmission gear 242 and the transmission shaft 243 of the decelerator 24 rotate about the second central axis RC2. The idle gear 41 and the rotation shaft 43 rotate about the third central axis RC3. The pedal crank shaft 22 and the driven gear 233 rotate about the fourth central axis RC4. The diameter of the idle gear 41 is less than any of the diameter of the driven gear 233 and the diameter of the first transmission gear 241.

Figure 3:
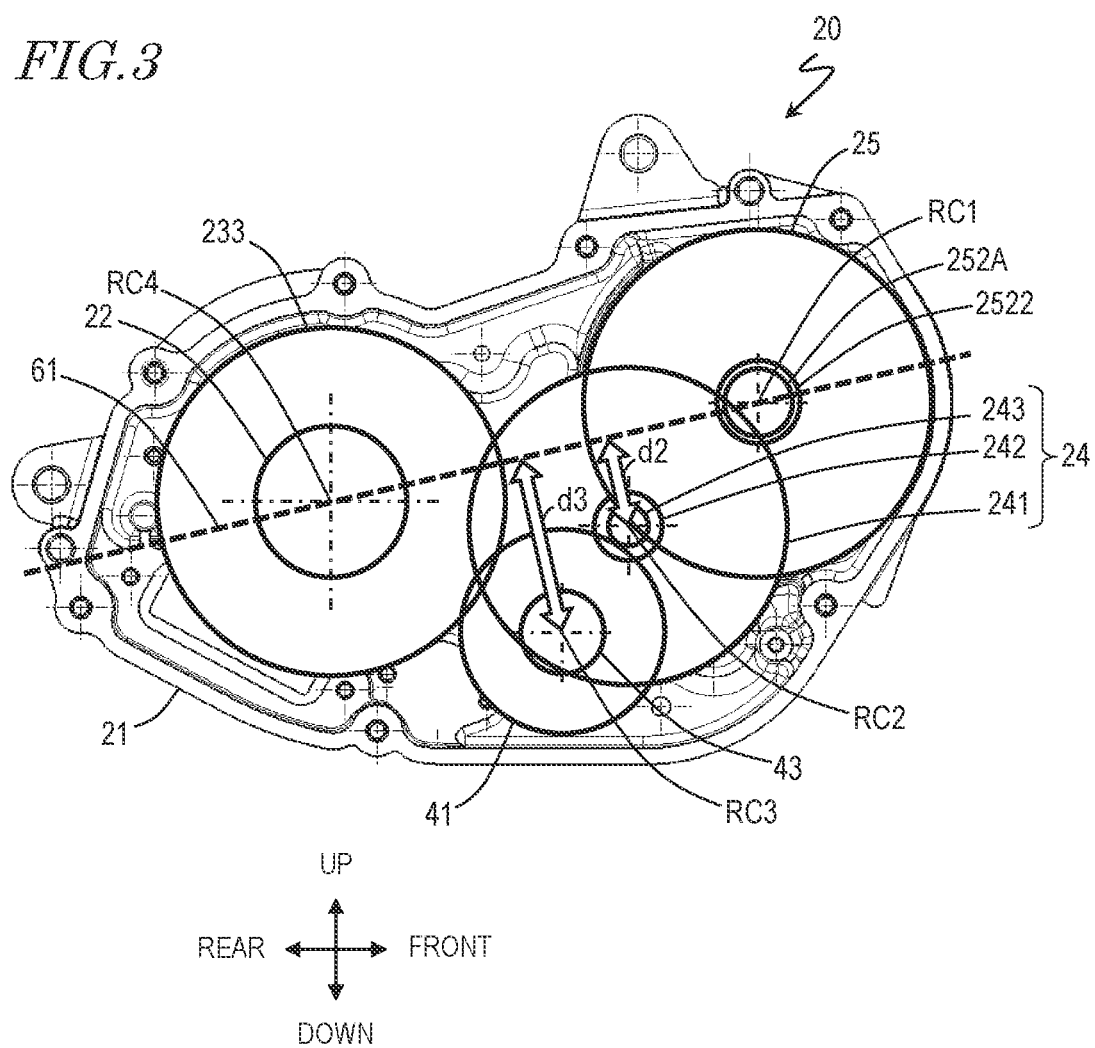
FIG. 3 is a view showing a positional relationship of components of the drive unit 20 according to a preferred embodiment of the present invention.

With reference to FIG. 3, a plane including the first central axis RC1 and the fourth central axis RC4 is labeled as a plane 61. In FIG. 3, a line (dashed line) along which the plane 61 and the sheet of the figure cross each other represents the position of the plane 61. This dashed line is a perpendicular line crossing each of the first central axis RC1 and the fourth central axis RC4 at the right angle, and corresponds to a perpendicular line connecting the first central axis RC1 and the fourth central axis RC4 to each other. This is also applicable to FIG. 4.

The distance from the plane 61 to the third central axis RC3 is labeled as d3. The distance from the plane 61 to the second central axis RC2 is labeled as d2. Distance d3 is longer than distance d2. More specifically, the idle gear 41 is located outward of the decelerator 24 in the housing 21.

The idle gear 41 does not decelerate or accelerate, and thus merely needs to have such a size as to achieve power transmission between the decelerator 24 and the driven gear 233. Therefore, the idle gear 41 may have a diameter less than each of the diameter of the first transmission gear 241 of the decelerator 24 and the diameter of the driven gear 233. The idle gear 41 and the decelerator 24 are located such that distance d3 is longer than distance d2, and consequently, the idle gear 41 having a relatively short diameter may be located outward of the first transmission gear 241. In other words, the first transmission gear 241 having a relatively long diameter may be located at a more inward position in the housing 21, and thus may be prevented from protruding outward. The housing 21 may have an outer contour along the idle gear 41 having a relatively short diameter, and not along the first transmission gear 241 having a relatively long diameter. Therefore, the size of the drive unit 20 may be decreased. The size of the drive unit 20 in the up-down direction may be decreased, and thus the minimum ground clearance of the electrically assisted bicycle 10 may be longer.

As shown in FIG. 3, the idle gear 41 is located below the drive unit 20 so that the degree of freedom of positional arrangement of the suspension 304 (FIG. 1) may be increased. Substantially the same effect is provided even in the case where the idle gear 41 is located above the drive unit 20. However, in the vehicle shown in FIG. 1 in which the suspension 304 is located above the drive unit 20, if the idle gear 41 is located above the drive unit 20, the position of the suspension 304 is influenced. The idle gear 41 is located below the drive unit 20 so that the degree of freedom of positional arrangement of the suspension 304 may be increased.

Figure 4:
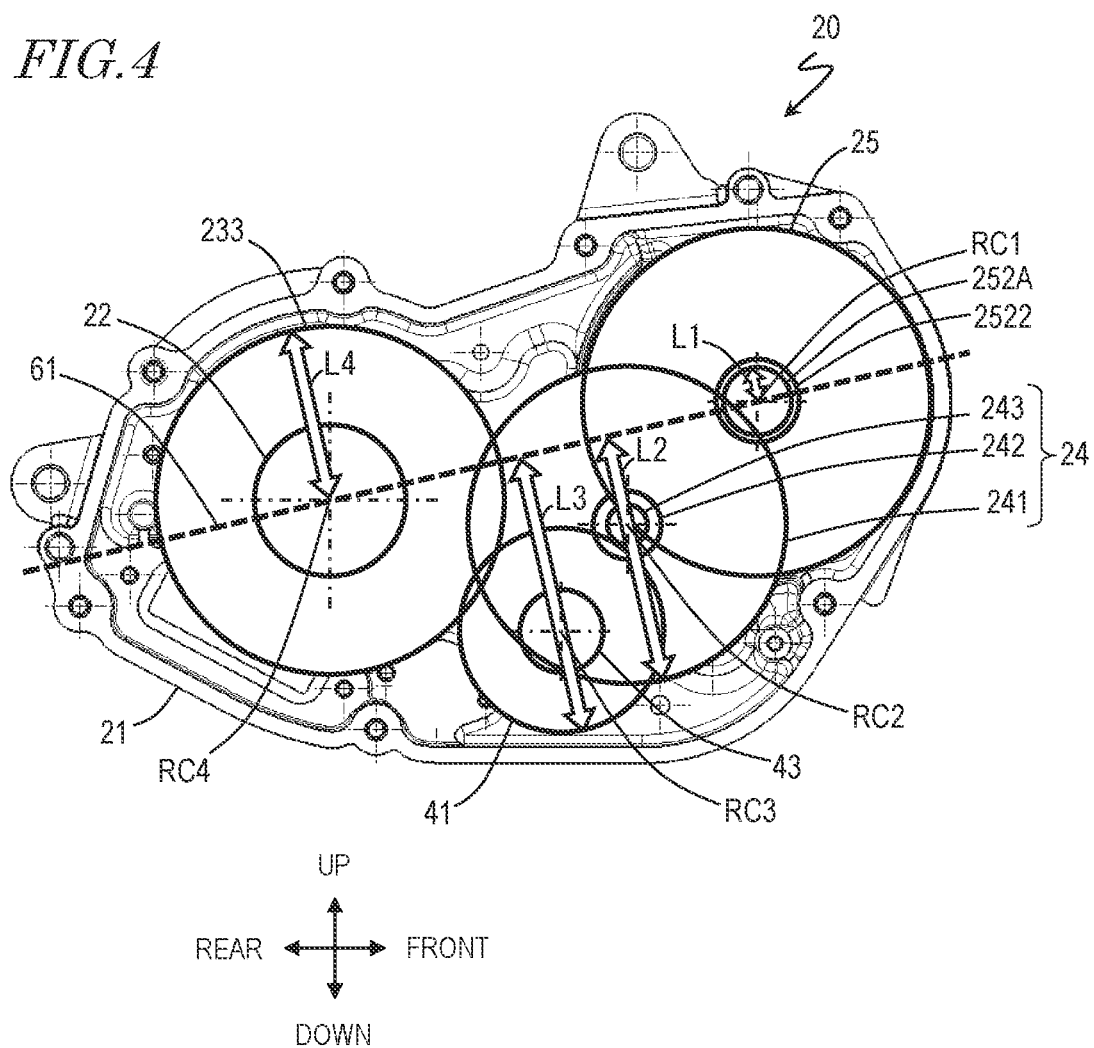
FIG. 4 is another view showing the positional relationship of the components of the drive unit 20 according to a preferred embodiment of the present invention.

With reference to FIG. 4, the positional relationship of the components of the drive unit 20 will be described further.

The distance from the plane 61 to a farthest point of the idle gear 41 is labeled as L3. The farthest point of the idle gear 41 is the position, on a tip circle connecting tips of the teeth of the idle gear 41, that is farthest from the plane 61. The distance from the plane 61 to a farthest point of the output gear 252A is labeled as L1. The distance from the plane 61 to a farthest point of the first transmission gear 241 is labeled as L2. The distance from the plane 61 to a farthest point of the driven gear 233 is labeled as L4. The farthest point of the output gear 252A is the position, on a tip circle connecting tips of the teeth of the output gear 252A, that is farthest from the plane 61. The farthest point of the first transmission gear 241 is the position, on a tip circle connecting tips of the teeth of the first transmission gear 241, that is farthest from the plane 61. The farthest point of the driven gear 233 is the position, on a tip circle connecting tips of the teeth of the driven gear 233, that is farthest from the plane 61.

Distance L3 is longer than any of distances L1, L2 and L4. Especially, distance L3 is longer than distance L2 so that the idle gear 41 having a relatively short diameter may be located outward of the first transmission gear 241. More specifically, the first transmission gear 241 having a relatively long diameter may be located at a more inward position in the housing 21, and thus may be prevented from protruding outward. With this structure, the size of the drive unit 20 may be decreased.

Figure 5:
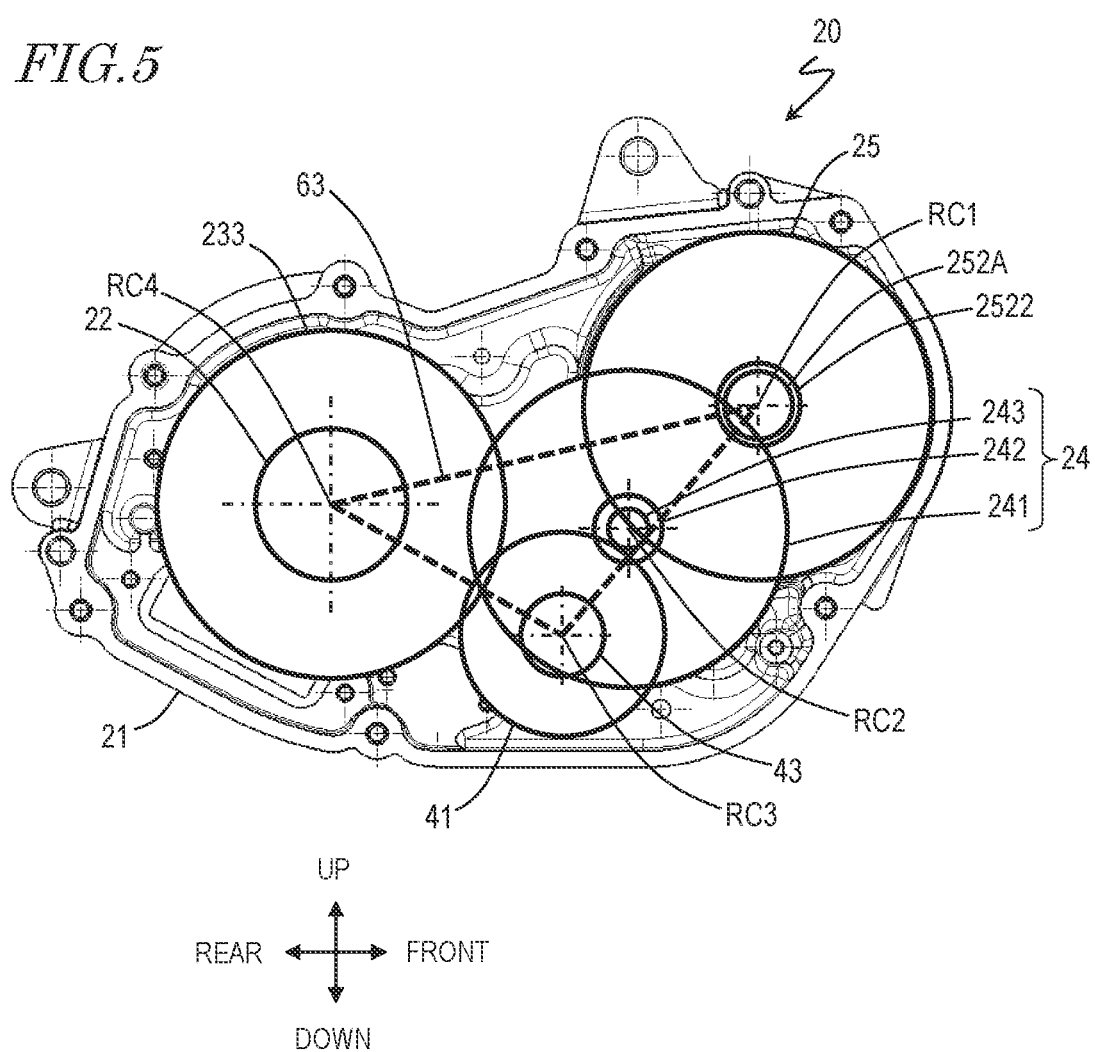
FIG. 5 is still another view showing the positional relationship of the components of the drive unit 20 according to a preferred embodiment of the present invention.

With reference to FIG. 5, the positional relationship of the components of the drive unit 20 will be described still further.

In the drive unit 20 as seen in the axial direction, a triangle having three axes, among the first through fourth central axes RC1 through RC4, as apexes is set. The remaining one axis among the first through fourth central axes RC1 through RC4 is located inside the triangle. FIG. 5 shows, as an example, a triangle 63 having the central axes RC1, RC3 and RC4 as the apexes as seen in the axial direction. In the example shown in FIG. 5, the second central axis RC2 of the first transmission gear 241 is located inside the triangle 63 having the central axes RC1, RC3 and RC4 as the apexes. The first transmission gear 241 having a relatively long diameter is located at a more inward position in the housing 21 so that the first transmission gear 241 may be prevented from protruding outward. With this structure, the size of the drive unit 20 may be decreased.

Now, the positional relationship between the first transmission gear 241 of the decelerator 24 and the driven gear 233 will be described.

With reference to FIG. 3, in this preferred embodiment, in the drive unit 20 as seen in the axial direction, the first transmission gear 241 and the driven gear 233 are located such that at least a portion of the driven gear 233 overlaps the first transmission gear 241.

The driven gear 233 and the first transmission gear 241 are located such that at least a portion of the driven gear 233 and the first transmission gear 241 overlap each other, and consequently, the second central axis RC2 and the fourth central axis RC4 may be closer to each other. With this structure, the first central axis RC1 and the fourth central axis RC4 may be closer to each other. The distance between the first central axis RC1 and the fourth central axis RC4 may be shortened, and thus the size of the drive unit 20 in the front-rear direction may be decreased.

The size of the drive unit 20 in the front-rear direction is decreased so that a space for the battery unit 26 (FIG. 1) to be located in the down tube 123 (FIG. 1) is provided. In a vehicle in which the battery unit is located in the down tube, the battery unit is located in a space between the pedal crank shaft and the front wheel in the front-rear direction of the vehicle (located in a front center portion). An attempt to increase the capacitance of the battery results in an increase in the size of the battery unit, and the front center length needs to be longer accordingly. However, in the case where the front center length is longer, there occurs a problem that the operability of the vehicle is decreased.

According to this preferred embodiment, the size of the drive unit 20 in the front-rear direction is decreased so that the degree of freedom of positional arrangement of the battery unit 26 may be increased. The battery unit 26 having a large capacitance may easily be located without increasing the front center length.

Now, with reference to FIG. 6, the positional relationship among the first transmission gear 241 of the decelerator 24, the idle gear 41 and the driven gear 233 will be described.

Figure 6:
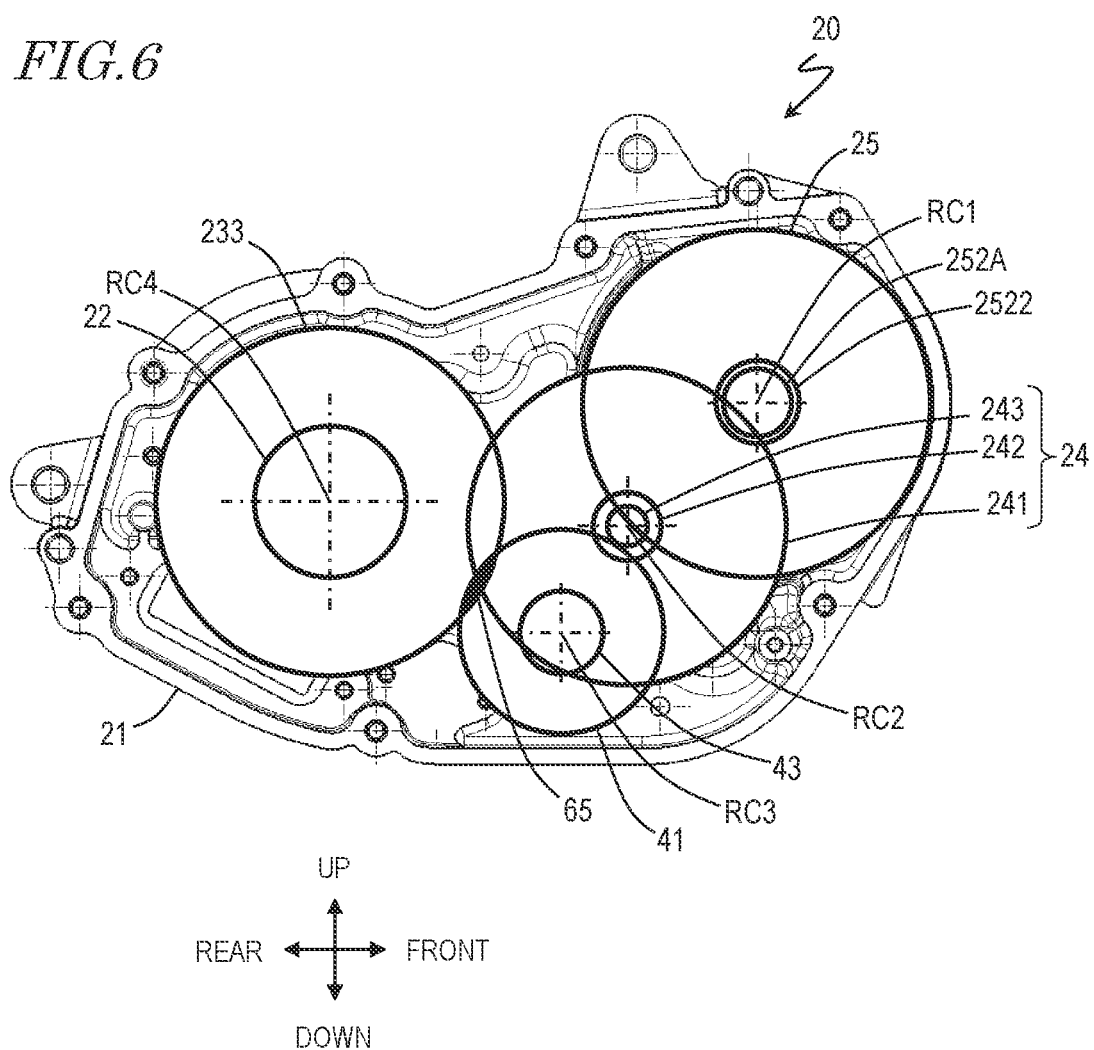
FIG. 6 is still another view showing the positional relationship of the components of the drive unit 20 according to a preferred embodiment of the present invention.

In the drive unit 20 as seen in the axial direction, the driven gear 233 and the idle gear 41 are engaged with each other in a region 65 (black portion in FIG. 6). In this preferred embodiment, the first transmission gear 241, the idle gear 41 and the driven gear 233 are located such that at least a portion of the region 65, where the driven gear 233 and the idle gear 41 are engaged with each other, overlaps the first transmission gear 241.

The first transmission gear 241, the idle gear 41 and the driven gear 233 are located such that at least a portion of the region 65, where the driven gear 233 and the idle gear 41 are engaged with each other, overlaps the first transmission gear 241. Consequently, the second central axis RC2 and the fourth central axis RC4 may be closer to each other. With this structure, the first central axis RC1 and the fourth central axis RC4 may be closer to each other. The distance between the first central axis RC1 and the fourth central axis RC4 may be shortened, and thus the size of the drive unit 20 in the front-rear direction may be decreased.

Now, with respect to FIG. 6, the positional relationship between the third central axis RC3 and the first transmission gear 241 of the decelerator 24 will be described. The idle gear 41 rotates about the third central axis RC3.

In the drive unit 20 as seen in the axial direction, the third central axis RC3 overlaps the first transmission gear 241. The idle gear 41 and the decelerator 24 are located such that the third central axis RC3 and the first transmission gear 241 overlap each other, and consequently, the second central axis RC2 and the third central axis RC3 may be closer to each other. With this structure, the first central axis RC1 and the fourth central axis RC4 may be closer to each other. The distance between the first central axis RC1 and the fourth central axis RC4 may be shortened, and thus the size of the drive unit 20 in the front-rear direction may be decreased.

Support Structure of the Driven Gear

Now, a structure that supports the driven gear 233 will be described. FIG. 7 is a cross-sectional view showing an example of structure of the driven gear 233 and the vicinity thereof in the drive unit 20.

As described above, the driven gear 233 is provided in the outer member 52 of the one-way clutch 50. The drive sprocket 34 is attached to a portion of the outer member 52 that is outward of (to the right of) the housing 21.

While the electrically assisted bicycle 10 is running with both of the outer member 52 and the drive sprocket 34 rotating, a load is applied from the drive sprocket 34 to the outer member 52. Because of the load from the drive sprocket 34, precession is caused in the outer member 52 including the driven gear 233. In the case where the precession is large, there occurs a problem that the meshing precision of the driven gear 233 and the idle gear 41 is decreased.

In this preferred embodiment, two bearings 381R and 382R are provided as the bearing 38R supporting the outer member 52. The bearings 381R and 382R are each a rolling-element bearing including an inner race, an outer race and a rolling element. The outer race of each of the bearings 381R and 382R is press-fit into the second case 212 of the housing 21, and the outer member 52 is clearance-fit into the inner race thereof.

In the left-right direction of the drive unit 20, the bearing 382R is located at an outer position whereas the bearing 381R is located at an inner position. The bearings 381R and 382R may be in contact with each other, or may be located separately from each other.

The outer member 52 is supported by the two bearings 381R and 382R so that the rotation shake of the outer member 52 may be decreased, and thus the precession of the outer member 52 may be decreased. The decrease in the precession may improve the meshing precision of the driven gear 233 and the idle gear 41. With this structure, the noise generated when the driven gear 233 and the idle gear 41 are meshed with each other may be decreased, and abrasion of the rotation shaft may be decreased. In addition, the sealability of the bearings 381R and 382R supporting the outer member 52 may be improved.

Now, the positional relationship among the drive sprocket 34, the driven gear 233 and the bearings 381R and 382R will be described.

In the axial direction of the pedal crank shaft 22, the distance to the most inward position of the bearing 381R (left end portion of the bearing 381R) from a position 341, in the outer member 52, to which the drive sprocket 34 is attached is labeled as a. In the axial direction of the pedal crank shaft 22, the distance from the attachment position 341 to the center of a portion where the driven gear 233 and the idle gear 41 are meshed with each other is labeled as b. The relationship between distance a and distance b may be represented by expression 1 below.

$$a/b \geq 0.5 \qquad \text{expression 1}$$

The bearing 381R is located at an inner position in the left-right direction of the drive unit 20. As the position of the bearing 381R is farther from the position 341 at which the drive sprocket 34 is attached, the precession of the outer member 52 may be decreased more. The bearing 381R is located such that the left end portion thereof is located inward of the middle position of distance b in the left-right direction of the drive unit 20, and consequently, the precession of the outer member 52 may be decreased more.

The bearing 381R is located far from the position 341 at which the drive sprocket 34 is attached, whereas the bearing 382R is located as close as possible to the attachment position 341, so that the precession of the outer member 52 may be decreased more. For example, the bearing 382R is located such that a left end portion thereof is located outward of the middle position of distance b in the left-right direction of the drive unit 20. Consequently, the precession of the outer member 52 may be decreased more.

The bearings 381R and 382R may have the same size as, or different sizes from, each other.

A multi-row bearing may be used instead of the bearings 381R and 382R. Examples of the usable multi-row bearing include a multi-row angular bearing, a multi-row deep groove bearing and the like, but are not limited any of these. A needle bearing may be used instead of the bearings 381R and 382R.

Heat Dissipation Structure

Figure 8:
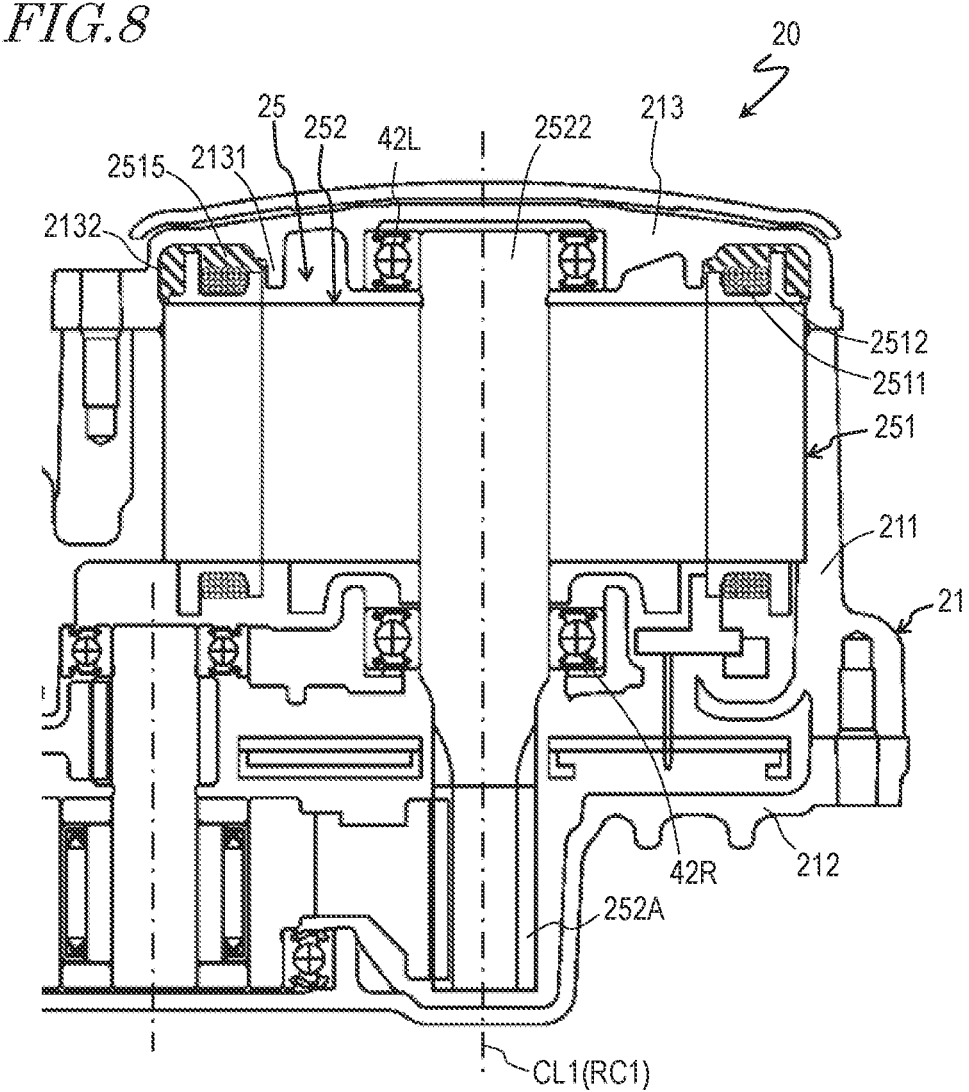
FIG. 8 is a cross-sectional view showing a structure of an electric motor 25 and the vicinity thereof in the drive unit 20 according to a preferred embodiment of the present invention.

Now, a structure that dissipates heat generated in the coils 2511 of the electric motor 25 to the outside will be described. FIG. 8 is a cross-sectional view showing a structure of the electric motor 25 and the vicinity thereof in the drive unit 20. In the example shown in FIG. 8, a heat dissipation agent 2515 (hatched portion in FIG. 8) is located between the stator 251 of the electric motor 25 and the cover 213 of the housing 21. The heat dissipation agent 2515 is provided between the coils 2511 wound around the bobbins 2512 of the stator 251 and the cover 213 so that the heat generated in the coils 2511 may be dissipated outside efficiently.

The heat dissipation agent 2515 may be made of any material having a high heat conductivity. Examples of the material usable for the heat dissipation agent 2515 include highly heat-conductive epoxy and unsaturated polyester resins each having an alumina filler incorporated thereto, but are not limited to any of these.

It is possible to dissipate the heat even in the case where the entire circumference of each of the coils 2511 wound around the bobbins 2512 is covered with the heat dissipation agent 2515. However, in the case where the heat dissipation agent 2515 is provided to fill the space so as to cover the entire circumference of each of the coils 2511, there occurs a problem that the weight of the drive unit 20 is increased. In the case where the entire circumference of each of the coils 2511 is covered with the heat dissipation agent 2515, a mold to be filled with the heat dissipation agent 2515 is needed, and thus there occurs a problem that the production cost and the number of production steps are increased.

In this preferred embodiment, the heat dissipation agent 251 is provided only between the stator 251 and the cover 213 so that the heat generated in the coils 2511 may be dissipated to the outside efficiently while reducing or minimizing the increase in the weight.

With reference to FIG. 8, the cover 213 in this preferred embodiment includes an inner wall 2131. The cover 213 has a shape with which a left portion of each of the bobbins 2512, around each of which the coil 2511 is wound, is covered with the inner wall 2131 and an outer circumferential wall 2132 of the cover 213. During the production of the drive unit 20, the heat dissipation agent 2515 is applied between the inner wall 2131 and the wall 2132 of the cover 213. The cover 213 having the heat dissipation agent 2515 applied thereto is attached to the first case 211 of the housing 21, and thus the structure including the heat dissipation agent 2515 between the coils 2511 and the cover 213 may easily be realized. A mold to be filled with the heat dissipation agent 2515 is not needed, and thus the production cost and the number of production steps may be decreased.

The cover 213 includes the inner wall 2131, so that while the heat dissipation agent 2515 is applied to the cover 213, the heat dissipation agent 2515 may be prevented from flowing to an area where the heat dissipation agent 2515 is not necessary. The left portion of each of the bobbins 2512, around each of which the coil 2511 is wound, is covered with the inner wall 2131 and the wall 2132 of the cover 213, so that the heat dissipation agent 2515 may be prevented from flowing toward the rotor 252.

Preferred embodiments of the present invention have been described above. The present invention is not limited to the above-described preferred embodiments. For example, in the above-described preferred embodiments, the electrically assisted bicycle including the suspension is described as an example. Preferred embodiments of the present invention are preferably applicable also to an electrically assisted bicycle with no suspension.

In the above-described preferred embodiments, the drive unit 20 (FIG. 2) includes four shafts, namely, the output shaft 2522, the transmission shaft 243, the rotation shaft 43 and the pedal crank shaft 22. The number of the shafts is not limited to four. Preferred embodiments of the present invention are applicable to a drive unit including five or more shafts. For example, preferred embodiments of the present invention are applicable to a drive unit in which a gear is provided between the output gear 252A of the electric motor 25 and the first transmission gear 241 of the decelerator 24 and a torque is transmitted from the output gear 252A to the first transmission gear 241 via the above-mentioned gear.

In the above-described preferred embodiments, the entirety of the electric motor 25 is accommodated in the housing 21. The structure of the housing 21 is not limited to this. Only a portion of the electric motor 25 may be accommodated in the housing 21. For example, a left portion of the first case 211 may have an opening through which the electric motor 25 may extend, and the electric motor 25 may be attached such that a portion thereof is located in the housing 21 through the opening. In this case, the opening may be provided with a dust-proof and waterproof cover.

The cover 213 (FIG. 2) may be a portion of the housing 21, and may be included in the housing 21. The cover 213 may have such a shape as to cover a side surface of the electric motor 25, and the electric motor 25 may be supported by the cover 213. A form in which the electric motor 25 is supported by the cover 213 is encompassed in the form in which the electric motor 25 is supported by the housing 21.

In the above-described preferred embodiments, the electrically assisted bicycle with two wheels is described as an example of the electrically assisted vehicle 10. The present invention is not limited to this. For example, the electrically assisted vehicle 10 may be an electrically assisted vehicle with three or more wheels.

In the above-described preferred embodiments, the drive wheel to which the human power generated by the rider stepping on the pedals and the assist power generated by the motor are transmitted is the rear wheel. The present invention is not limited to this. The human power and the assist power may be transmitted to the front wheel, or both of the front wheel and the rear wheel, in accordance with the form of the electrically assisted bicycle.

In the above-described preferred embodiments, the vehicle is the electrically assisted bicycle, but alternatively, may be a vehicle other than the electrically assisted bicycle. Preferred embodiments of the present invention are preferably applicable to any vehicle in which the drive unit is required to have a decreased size.

Illustrative preferred embodiments of the present invention have been described above.

A drive unit 20 according to a preferred embodiment of the present invention is usable in an electrically assisted vehicle 10. The drive unit includes an electric motor 25 including an output shaft 2522 including an output gear 252A; a housing 21 accommodating a portion of, or the entirety of, the electric motor 25; a pedal crank shaft 22 extending through the housing 21, rotatably supported by the housing 21, and provided with a driven gear 233; a transmission mechanism 40 to transmit a torque of the output gear 252A of the electric motor 25 to the driven gear 233; and a resultant force output shaft 235 rotatable coaxially with the pedal crank shaft 22, the resultant force output shaft 235 combining a pedal effort and an assist power of the electric motor 25. The transmission mechanism 40 includes a decelerator 24 rotatably supported by the housing 21 in the housing 21, and an idle gear 41 rotatably supported by the housing 21 in the housing 21. The decelerator 24 increases the torque of the output shaft 252A of the electric motor 25, and the increased torque is transmitted to the driven gear 233 via the idle gear 41.

In order to shorten the rear center length of the electrically assisted vehicle 10, it is conceivable to shorten the diameter of the driven gear 233 provided on the pedal crank shaft 22. If a "two-axial decelerator" is located between the driven gear 233 on the pedal crank shaft 22 and the electric motor 25, it is difficult to shorten the width of the drive unit 20 in the axial direction. Two gears having different diameters from each other and including different numbers of teeth from each other are located, in the axial direction, on the rotation shaft of the decelerator. Therefore, the size of the rotation shaft in the axial direction tends to be increased. The two-axial decelerator includes two such rotation shafts, and the two rotation shafts are located as shifted from each other in the axial direction. Therefore, the size of the two-axial decelerator in the axial direction is increased.

According to a preferred embodiment of the present invention, the idle gear 41 is used so that the diameter of the driven gear 233 may be decreased, and thus the rear center length of the electrically assisted bicycle 10 may be shortened, with no increase in the width (size in the axial direction) of the drive unit 20. The use of the idle gear 41 may also improve the degree of freedom of positional arrangement of the electric motor 25, the decelerator 24 and the driven gear 233, and thus may further decrease the size of the drive unit 20.

In a preferred embodiment of the present invention, the electric motor 25 may be supported by the housing 21 such that the output shaft 2522 rotates about a first central axis RC1. The decelerator 24 may be supported by the housing 21 in the housing 21 so as to be rotatable about a second central axis RC2, and may include a first transmission gear 241, a second transmission gear 242 including teeth of a smaller number than that of the first transmission gear 241, and a transmission shaft 243 to transmit a rotation of the first transmission gear 241 to the second transmission gear 242. The idle gear 41 may be supported by the housing 21 in the housing 21 so as to be rotatable about a third central axis RC3. The pedal crank shaft 22 may extend through the housing 21 along a fourth central axis RC4, and may be supported by the housing 21 so as to be rotatable about the fourth central axis RC4.

The torque increased by the two transmission gears having different numbers of teeth from each other may be transmitted to the driven gear 233 via the idle gear 41.

In a preferred embodiment of the present invention, the idle gear 41 may be engaged with each of the second transmission gear 242 of the decelerator 24 and the driven gear 233.

The idle gear 41 is engaged with each of the second transmission gear 242 and the driven gear 233 so that the torque may be transmitted from the decelerator 24 to the driven gear 233 via the single idle gear 41. The presence of such an idle gear 41 may easily decrease the size of the driven gear 233.

In a preferred embodiment of the present invention, the first transmission gear 241 of the decelerator 24 may be engaged with the output gear 252A of the electric motor 25.

Since the single decelerator 24 and the single idle gear 41 transmit the torque of the electric motor 25 to the driven gear 233, the size of the drive unit 20 may be decreased with no use of any extra gear.

In a preferred embodiment of the present invention, distance d3 from a plane 61 including the first central axis RC1 and the fourth central axis RC4 to the third central axis RC3 may be longer than distance d2 from the plane 61 to the second central axis RC2, and the idle gear 41 may have a diameter less than any of a diameter of the driven gear 233 and a diameter of the first transmission gear 241.

The idle gear 41 does not decelerate or accelerate, and thus merely needs to have such a size as to achieve power transmission between the decelerator 24 and the driven gear 233. Therefore, the idle gear 41 may have a diameter less than each of the diameter of the first transmission gear 241 of the decelerator 24 and the diameter of the driven gear 233 on the pedal crank shaft 22. Distance d3 from the plane 61 including the first central axis RC1 and the fourth central axis RC4 to the third central axis RC3 is longer than distance d2 from the plane 61 to the second central axis RC2 so that the idle gear 41 having a relatively short diameter may be located outward of the first transmission gear 241. In other words, the first transmission gear 241 having a relatively long diameter may be located at a more inward position in the housing 21, and thus may be prevented from protruding outward. The housing 21 may have an outer contour along the idle gear 41 having a relatively short diameter, not along the first transmission gear 241 having a relatively long diameter. Therefore, the size of the drive unit 20 may be decreased.

In a preferred embodiment of the present invention, distance L3 from the plane 61 including the first central axis RC1 and the fourth central axis RC4 to a farthest point of the idle gear 41 may be longer than each of distance L1 from the plane 61 to a farthest point of the output gear 252A, distance L2 from the plane 61 to a farthest point of the first transmission gear 241, and distance L4 from the plane 61 to a farthest point of the driven gear 233, and the idle gear 41 may have a diameter less than any of a diameter of the driven gear 233 and a diameter of the first transmission gear 241.

The idle gear 41 does not decelerate or accelerate, and thus merely needs to have such a size as to achieve power transmission between the decelerator 24 and the driven gear 233. Therefore, the idle gear 41 may have a diameter less than each of the diameter of the first transmission gear 241 of the decelerator 24 and the diameter of the driven gear 233 on the pedal crank shaft 22. Distance L3 from the plane 61 including the first central axis RC1 and the fourth central axis RC4 to the farthest point of the idle gear 41 is longer than each of distance L1 from the plane 61 to the farthest point of the output gear 252A, distance L2 from the plane 61 to the farthest point of the first transmission gear 241, and distance L4 from the plane 61 to the farthest point of the driven gear 233. With this structure, the idle gear 41 having a relatively short diameter may be located outward of the first transmission gear 241. In other words, the first transmission gear 241 having a relatively long diameter may be located at a more inward position in the housing 21, and thus may be prevented from protruding outward. The housing 21 may have an outer contour along the idle gear 41 having a relatively short diameter, and not along the first transmission gear 241 having a relatively long diameter. Therefore, the size of the drive unit 20 may be decreased.

In a preferred embodiment of the present invention, as seen in an axial direction parallel to the first central axis RC1, a triangle having three axes among the first through fourth central axes RC1 through RC4 as apexes may have the remaining one axis located therein.

The gear rotating about the remaining one axis may be located at a more inward position in the housing 21, and thus the gear may be prevented from protruding outward. With this structure, the size of the drive unit 20 may be decreased.

In a preferred embodiment of the present invention, as seen in an axial direction parallel to the first central axis RC1, the second central axis RC2 may be located inside a triangle having the first central axis RC1, the third central axis RC3 and the fourth central axis RC4 as apexes.

The idle gear 41 does not decelerate or accelerate, and thus merely needs to have such a size as to achieve power transmission between the decelerator 24 and the driven gear 233. Therefore, the idle gear 41 may have a diameter less than each of the diameter of the first transmission gear 241 of the decelerator 24 and the diameter of the driven gear 233 on the pedal crank shaft 22. The second central axis RC2 is located inside a triangle having the first central axis RC1, the third central axis RC3 and the fourth central axis RC4 as the apexes. With this structure, the first transmission gear 241 having a relatively long diameter may be located at a more inward position in the housing 21, and thus may be prevented from protruding outward. The housing 21 may have an outer contour along the idle gear 41 having a relatively short diameter, and not along the first transmission gear 241 having a relatively long diameter. Therefore, the size of the drive unit 20 may be decreased.

In a preferred embodiment of the present invention, as seen in an axial direction parallel to the first central axis RC1, at least a portion of the driven gear 233 may overlap the first transmission gear 241.

The driven gear 233 and the first transmission gear 241 are located such that at least a portion of the driven gear 233 and the first transmission gear 241 overlap each other, and consequently, the second central axis RC2 and the fourth central axis RC4 may be closer to each other. With this structure, the first central axis RC1 and the fourth central axis RC4 may be closer to each other. The distance between the first central axis RC1 and the fourth central axis RC4 may be shortened, and thus the size of the drive unit 20 in the front-rear direction may be decreased. The size of the drive unit 20 in the front-rear direction is decreased so that the space for the battery unit 26 to be located in the down tube 123 is provided.

In a vehicle in which the battery unit is located in the down tube, the battery unit is located in a space between the pedal crank shaft and the front wheel in the front-rear direction of the vehicle (located in a front center portion). An attempt to increase the capacitance of the battery results in an increase in the size of the battery unit, and the front center length needs to be longer accordingly. However, in the case where the front center length is longer, there occurs a problem that the operability of the vehicle is decreased.

According to a preferred embodiment of the present invention, the size of the drive unit 20 in the front-rear direction is decreased so that the degree of freedom of positional arrangement of the battery unit 26 may be increased. The battery unit 26 having a large capacitance may easily be located without increasing the front center length.

In a preferred embodiment of the present invention, as seen in an axial direction parallel to the first central axis RC1, at least a portion of a region 65 where the driven gear 233 and the idle gear 41 are engaged with each other may overlap the first transmission gear 241.

The first transmission gear 241, the idle gear 41 and the driven gear 233 are located such that at least a portion of the region 65, where the driven gear 233 and the idle gear 41 are engaged with each other, overlaps the first transmission gear 241. Consequently, the second central axis RC2 and the fourth central axis RC4 may be closer to each other. With this structure, the first central axis RC1 and the fourth central axis RC4 may be closer to each other. The distance between the first central axis RC1 and the fourth central axis RC4 may be shortened, and thus the size of the drive unit 20 in the front-rear direction may be decreased.

In a preferred embodiment of the present invention, as seen in an axial direction parallel to the first central axis RC1, the third central axis RC3 may overlap the first transmission gear 241.

The idle gear 41 and the decelerator 24 are located such that the third central axis RC3 and the first transmission gear 241 overlap each other, and consequently, the second central axis RC2 and the third central axis RC3 may be closer to each other. With this structure, the first central axis RC1 and the fourth central axis RC4 may be closer to each other. The distance between the first central axis RC1 and the fourth central axis RC4 may be shortened, and thus the size of the drive unit 20 in the front-rear direction may be decreased.

In a preferred embodiment of the present invention, the pedal crank shaft 22 may be provided with a one-way clutch 50.

The pedal crank shaft 22 is provided with the one-way clutch 50 so that a structure in which a forward rotation of the pedal crank shaft 22 is transmitted to the drive sprocket 34 but a reverse rotation of the pedal crank shaft 22 is not transmitted to the drive sprocket 34 may be provided.

An electrically assisted vehicle 10 according to a preferred embodiment of the present invention includes the above-described drive unit 20.

The electrically assisted vehicle 10 includes the drive unit 20 in which the driven gear 233 provided on the pedal crank shaft 22 has a short diameter so that the rear center length of the electrically assisted vehicle 10 may be shortened.

Preferred embodiments of the present invention are especially useful in the field of electrically assisted vehicles and drive units mountable on the electrically assisted vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive unit usable in an electrically assisted vehicle, the drive unit comprising:
    an electric motor including an output shaft including an output gear;
    a housing accommodating a portion of, or an entirety of, the electric motor;
    a pedal crank shaft extending through the housing, rotatably supported by the housing, and including a driven gear;
    a transmission to transmit a torque of the output gear of the electric motor to the driven gear; and
    a resultant force output shaft rotatable coaxially with the pedal crank shaft to combine a pedal effort and an assist power of the electric motor; wherein
    the transmission includes:
        a decelerator rotatably supported by the housing in the housing; and
        an idle gear rotatably supported by the housing in the housing;
    the decelerator increases the torque of the output shaft of the electric motor;
    the increased torque is transmitted to the driven gear via the idle gear;
    the electric motor is supported by the housing such that the output shaft rotates about a first central axis;
    the decelerator is supported by the housing in the housing so as to be rotatable about a second central axis, and includes a first transmission gear, a second transmission gear including teeth of a smaller number than that of the first transmission gear, and a transmission shaft to transmit a rotation of the first transmission gear to the second transmission gear;
    the idle gear is supported by the housing in the housing so as to be rotatable about a third central axis;
    the pedal crank shaft extends through the housing along a fourth central axis and is supported by the housing so as to be rotatable about the fourth central axis; and
    as seen in an axial direction parallel to the first central axis, the second central axis is located inside a triangle having the first central axis, the third central axis and the fourth central axis as apexes.

2. The drive unit of claim 1, wherein the idle gear is engaged with each of the second transmission gear of the decelerator and the driven gear.

3. The drive unit of claim 2, wherein the first transmission gear of the decelerator is engaged with the output gear of the electric motor.

4. The drive unit of claim 1, wherein
    a distance from a plane including the first central axis and the fourth central axis to a farthest point of the idle gear is longer than each of a distance from the plane to a farthest point of the output gear, a distance from the plane to a farthest point of the first transmission gear, and a distance from the plane to a farthest point of the driven gear; and
    the idle gear has a diameter less than any of a diameter of the driven gear and a diameter of the first transmission gear.

5. The drive unit of claim 1, wherein, as seen in the axial direction parallel to the first central axis, a triangle having three axes among the first through fourth central axes as apexes has the remaining one axis among the first through fourth central axes located therein.

6. The drive unit of claim 1, wherein the pedal crank shaft includes a one-way clutch.

7. An electrically assisted vehicle, comprising the drive unit according to claim 1.

8. A drive unit usable in an electrically assisted vehicle, the drive unit comprising:
    an electric motor including an output shaft including an output gear;
    a housing accommodating a portion of, or an entirety of, the electric motor;
    a pedal crank shaft extending through the housing, rotatably supported by the housing, and including a driven gear;
    a transmission to transmit a torque of the output gear of the electric motor to the driven gear; and
    a resultant force output shaft rotatable coaxially with the pedal crank shaft to combine a pedal effort and an assist power of the electric motor; wherein
    the transmission includes:
        a decelerator rotatably supported by the housing in the housing; and
        an idle gear rotatably supported by the housing in the housing;
    the decelerator increases the torque of the output shaft of the electric motor;
    the increased torque is transmitted to the driven gear via the idle gear;
    the electric motor is supported by the housing such that the output shaft rotates about a first central axis;
    the decelerator is supported by the housing in the housing so as to be rotatable about a second central axis, and includes a first transmission gear, a second transmission gear including teeth of a smaller number than that of the first transmission gear, and a transmission shaft to transmit a rotation of the first transmission gear to the second transmission gear;
    the idle gear is supported by the housing in the housing so as to be rotatable about a third central axis;
    the pedal crank shaft extends through the housing along a fourth central axis and is supported by the housing so as to be rotatable about the fourth central axis;
    a distance from a plane including the first central axis and the fourth central axis to the third central axis is longer than a distance from the plane to the second central axis; and
    the idle gear has a diameter less than any of a diameter of the driven gear and a diameter of the first transmission gear.

9. A drive unit usable in an electrically assisted vehicle, the drive unit comprising:
- an electric motor including an output shaft including an output gear;
- a housing accommodating a portion of, or an entirety of, the electric motor;
- a pedal crank shaft extending through the housing, rotatably supported by the housing, and including a driven gear;
- a transmission to transmit a torque of the output gear of the electric motor to the driven gear; and
- a resultant force output shaft rotatable coaxially with the pedal crank shaft to combine a pedal effort and an assist power of the electric motor; wherein the transmission includes:
- a decelerator rotatably supported by the housing in the housing; and
- an idle gear rotatably supported by the housing in the housing;

the decelerator increases the torque of the output shaft of the electric motor;

the increased torque is transmitted to the driven gear via the idle gear;

the electric motor is supported by the housing such that the output shaft rotates about a first central axis;

the decelerator is supported by the housing in the housing so as to be rotatable about a second central axis, and includes a first transmission gear, a second transmission gear including teeth of a smaller number than that of the first transmission gear, and a transmission shaft to transmit a rotation of the first transmission gear to the second transmission gear;

the idle gear is supported by the housing in the housing so as to be rotatable about a third central axis;

the pedal crank shaft extends through the housing along a fourth central axis and is supported by the housing so as to be rotatable about the fourth central axis; and as seen in an axial direction parallel to the first central axis, at least a portion of the driven gear overlaps the first transmission gear.

10. A drive unit usable in an electrically assisted vehicle, the drive unit comprising:
- an electric motor including an output shaft including an output gear;
- a housing accommodating a portion of, or an entirety of, the electric motor;
- a pedal crank shaft extending through the housing, rotatably supported by the housing, and including a driven gear;
- a transmission to transmit a torque of the output gear of the electric motor to the driven gear; and
- a resultant force output shaft rotatable coaxially with the pedal crank shaft to combine a pedal effort and an assist power of the electric motor; wherein the transmission includes:
- a decelerator rotatably supported by the housing in the housing; and
- an idle gear rotatably supported by the housing in the housing;

the decelerator increases the torque of the output shaft of the electric motor;

the increased torque is transmitted to the driven gear via the idle gear;

the electric motor is supported by the housing such that the output shaft rotates about a first central axis;

the decelerator is supported by the housing in the housing so as to be rotatable about a second central axis, and includes a first transmission gear, a second transmission gear including teeth of a smaller number than that of the first transmission gear, and a transmission shaft to transmit a rotation of the first transmission gear to the second transmission gear;

the idle gear is supported by the housing in the housing so as to be rotatable about a third central axis;

the pedal crank shaft extends through the housing along a fourth central axis and is supported by the housing so as to be rotatable about the fourth central axis; and as seen in an axial direction parallel to the first central axis, at least a portion of a region where the driven gear and the idle gear are engaged with each other overlaps the first transmission gear.

11. A drive unit usable in an electrically assisted vehicle, the drive unit comprising:
- an electric motor including an output shaft including an output gear;
- a housing accommodating a portion of, or an entirety of, the electric motor;
- a pedal crank shaft extending through the housing, rotatably supported by the housing, and including a driven gear;
- a transmission to transmit a torque of the output gear of the electric motor to the driven gear; and
- a resultant force output shaft rotatable coaxially with the pedal crank shaft to combine a pedal effort and an assist power of the electric motor; wherein the transmission includes:
- a decelerator rotatably supported by the housing in the housing; and
- an idle gear rotatably supported by the housing in the housing;

the decelerator increases the torque of the output shaft of the electric motor;

the increased torque is transmitted to the driven gear via the idle gear;

the electric motor is supported by the housing such that the output shaft rotates about a first central axis;

the decelerator is supported by the housing in the housing so as to be rotatable about a second central axis, and includes a first transmission gear, a second transmission gear including teeth of a smaller number than that of the first transmission gear, and a transmission shaft to transmit a rotation of the first transmission gear to the second transmission gear;

the idle gear is supported by the housing in the housing so as to be rotatable about a third central axis;

the pedal crank shaft extends through the housing along a fourth central axis and is supported by the housing so as to be rotatable about the fourth central axis; and as seen in an axial direction parallel to the first central axis, the third central axis overlaps the first transmission gear.

* * * * *